United States Patent
Kozlowski et al.

(10) Patent No.: US 9,664,236 B2
(45) Date of Patent: May 30, 2017

(54) FIXED CENTER CONSTANT VELOCITY JOINT

(75) Inventors: Keith A. Kozlowski, Saginaw, MI (US); Eduardo Mondragon, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 2324 days.

(21) Appl. No.: 11/950,587

(22) Filed: Dec. 5, 2007

(65) Prior Publication Data

US 2009/0149263 A1 Jun. 11, 2009

(51) Int. Cl.
*F16D 3/224* (2011.01)
*F16D 3/223* (2011.01)
*F16D 3/2245* (2011.01)

(52) U.S. Cl.
CPC ............. *F16D 3/223* (2013.01); *F16D 3/224* (2013.01); *F16D 3/2245* (2013.01); *F16D 2003/22303* (2013.01); *F16D 2003/22306* (2013.01)

(58) Field of Classification Search
USPC .................. 464/140, 144, 145, 906
See application file for complete search history.

(56) References Cited

U.S. PATENT DOCUMENTS

| | | | |
|---|---|---|---|
| 2,325,460 A | 11/1940 | Amberg | |
| 3,475,924 A | 11/1969 | Aucktor | |
| 5,242,329 A * | 9/1993 | Jacob | 464/145 |
| 6,848,999 B2 * | 2/2005 | Weckerling et al. | 464/145 |
| 2005/0090317 A1 * | 4/2005 | Hassenrik et al. | 464/145 |

FOREIGN PATENT DOCUMENTS

| | | |
|---|---|---|
| DE | 3700868 C1 * | 7/1988 |
| DE | 20221750 | 7/2007 |
| JP | 07269586 | 10/1995 |

OTHER PUBLICATIONS

European Search Report for Pat. App. No. EP 08169721.1, mailed on Apr. 26, 2013 from the European Patent Office.

* cited by examiner

*Primary Examiner* — Gregory Binda
(74) *Attorney, Agent, or Firm* — Cantor Colburn LLP

(57) ABSTRACT

A constant velocity joint includes an outer member defining a plurality of outer member ball tracks and an inner member defining a plurality of inner member ball tracks. The outer member ball tracks and the inner member ball tracks cooperate to define a plurality of uniform funnels having a uniform width along a longitudinal axis, and a plurality of diverging funnels having a diverging width along the longitudinal axis. A drive ball is disposed within each of the uniform funnels and the diverging funnels. A cage is disposed between the outer member and the inner member, and defines a plurality of windows with one of the drive balls disposed within each of the windows. The diverging funnels urge the drive balls along the longitudinal axis to pre-load the cage, while the uniform funnels do not urge the drive balls along the longitudinal axis, thereby reducing the amount of heat generated between the cage and the drive balls.

16 Claims, 3 Drawing Sheets

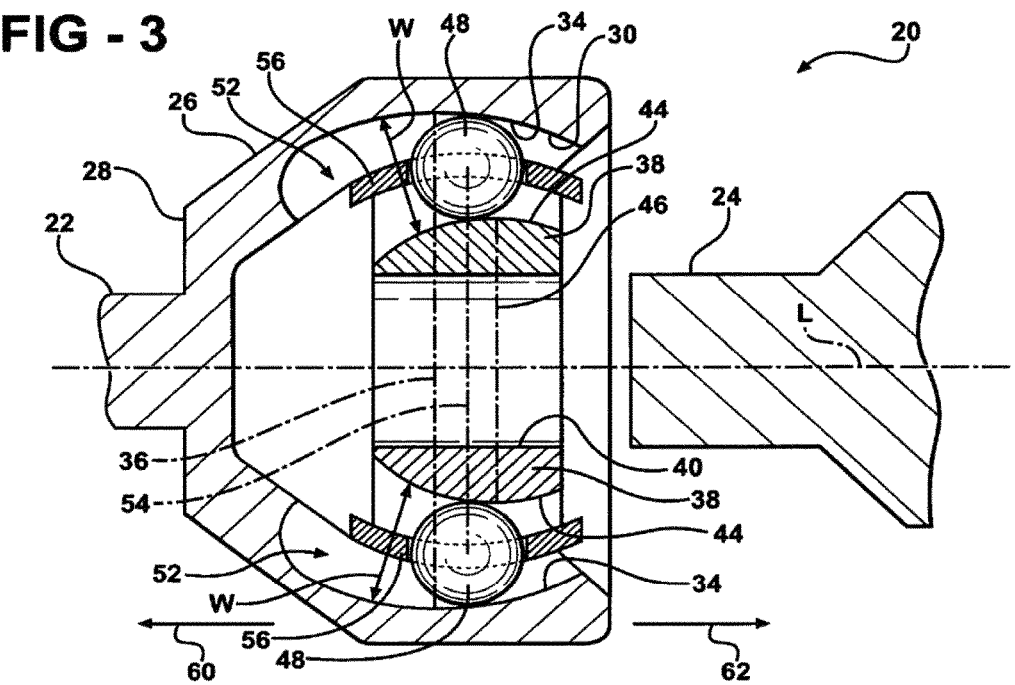
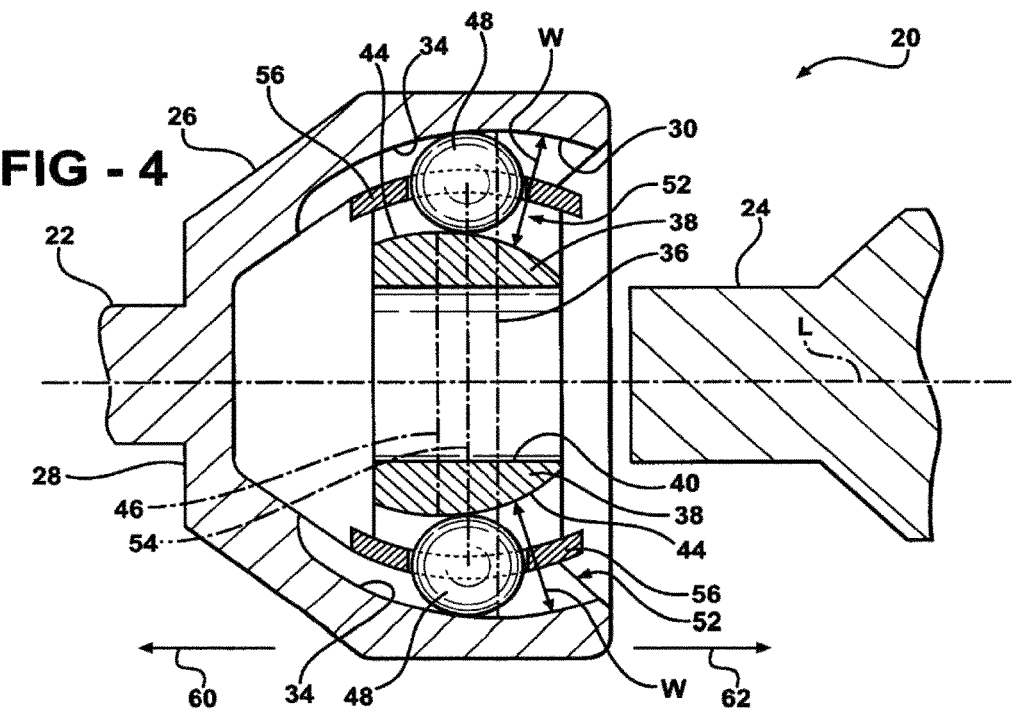

FIXED CENTER CONSTANT VELOCITY JOINT

BACKGROUND OF THE INVENTION

1. Field of the Invention

The subject invention relates to a constant velocity joint, and more specifically to a fixed center constant velocity joint.

2. Description of the Related Art

Fixed center constant velocity joints typically comprise an outer member, which defines a spherical interior and a plurality of outer member ball tracks within the interior. The interior and the plurality of outer member ball tracks extend along a longitudinal axis. The plurality of outer member ball tracks includes a first group of outer member ball tracks and a second group of outer member ball tracks. An inner member is disposed within the interior, and defines a spherical outer surface and a plurality of inner member ball tracks extending along the longitudinal axis. The plurality of inner member ball tracks includes a first group of inner member ball tracks and a second group of inner member ball tracks. The first group of inner member ball tracks opposes the first group of outer member ball tracks, diverging from one another in a first axial direction to define a first group of funnels. The second group of inner member ball tracks opposes the second group of outer member ball tracks to define a second group of funnels. The constant velocity joint further comprises a plurality of drive balls, with one of the drive balls disposed within each of the first group of funnels and within each of the second group of funnels. A cage is disposed between the outer member and the inner member, and defines a plurality of windows. One of the drive balls is disposed within each of the windows.

Typically, the first group of funnels and the second group of funnels include a diverging width, which urges the drive ball contained within each of the funnels in the direction of the diverging funnel. The first group of funnels and the second group of funnels may be arranged so that the funnels all diverge in the same direction, or may be arranged so that the first group of funnels and the second group of funnels diverge in opposing directions. U.S. Pat. No. 6,848,999 to Weckerling et al. discloses a fixed center constant velocity joint in which the first group of funnels diverge in an opposite direction from the second group of funnels, with the first group of funnels and the second group of funnels spaced radially about the longitudinal axis in an alternating relationship.

The diverging configuration of the funnels urges the drive balls in the direction in which the funnel diverges. The cage acts against the drive balls to resist the movement of the drive balls. Accordingly, it is said that the drive balls steer the cage, i.e., pre-load the cage to de-lash the joint and keep the cage from rattling. However, a significant amount of heat is generated by friction caused by the interaction between the cage and the drive balls as the cage resists movement of the drive balls.

SUMMARY OF THE INVENTION AND ADVANTAGES

The subject invention discloses a constant velocity joint. The constant velocity joint comprises an outer member, which defines an interior and a plurality of outer member ball tracks within the interior. The interior and the plurality of outer member ball tracks extend along a longitudinal axis. The plurality of outer member ball tracks includes a first group of outer member ball tracks and a second group of outer member ball tracks. An inner member is disposed within the interior. The inner member defines a plurality of inner member ball tracks, which extend along the longitudinal axis. The plurality of inner member ball tracks includes a first group of inner member ball tracks and a second group of inner member ball tracks. The first group of inner member ball tracks opposes the first group of outer member ball tracks to define a first group of funnels. The second group of inner member ball tracks opposes the second group of outer member ball tracks to define a second group of funnels. The constant velocity joint further comprises a plurality of drive balls, with one of the plurality of drive balls disposed within each of the first group of funnels and within each of the second group of funnels. A cage is disposed between the outer member and the inner member. The cage defines a plurality of windows, with one of the plurality of drive balls disposed within each of the plurality of windows. The first group of inner member ball tracks and the first group of outer member ball tracks of the first group of funnels are spaced from each other in parallel relationship relative to each other to define a uniform width between the first group of inner member ball tracks and the first group of outer member ball tracks along the longitudinal axis, thereby defining a plurality of uniform funnels. The second group of inner member ball tracks and the second group of outer member ball tracks of the second group of funnels are spaced from each other in non-parallel relationship to define a diverging width between the second group of inner member ball tracks and the second group of outer member ball tracks along the longitudinal axis, thereby defining a plurality of diverging funnels.

Accordingly, the constant velocity joint of the subject invention includes the first group of funnels, which are uniform in width, i.e., non-diverging, in combination with the second group of funnels, which are diverging. Therefore, the second group of funnels urges the drive balls along the longitudinal axis to pre-load the cage, while the first group of funnels do not. Thus, the interaction between the cage and the first group of funnels generates significantly less heat, thereby reducing the overall amount of heat generated by the constant velocity joint of the subject invention.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a cross section view along cut line 3-3 shown in FIG. 1;

FIG. 4 is a cross section view along cut line 4-4 shown in FIG. 1;

DETAILED DESCRIPTION OF THE INVENTION

Figure 1:
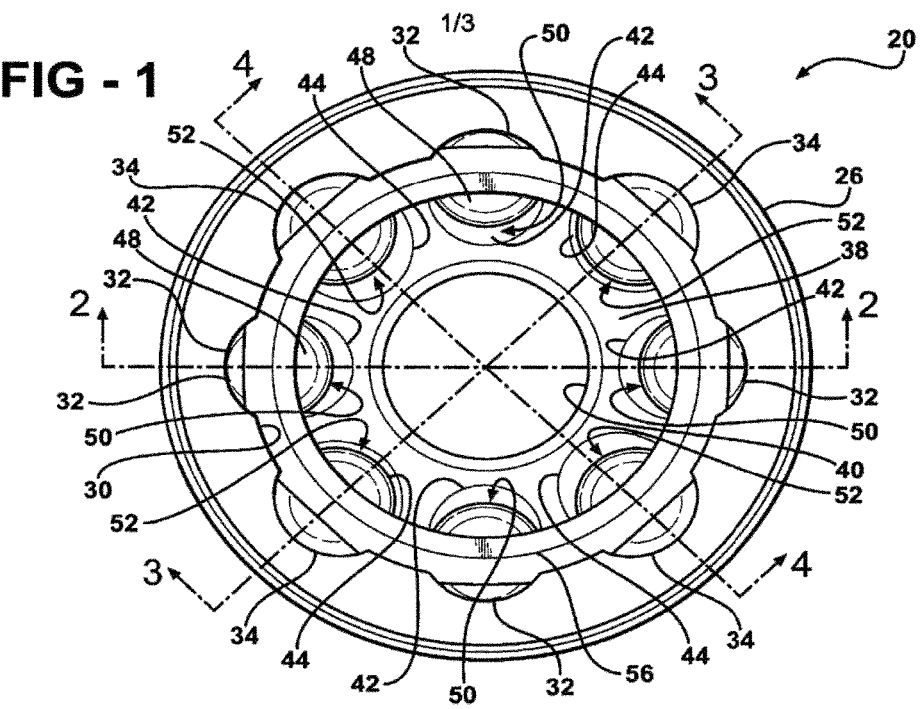
FIG. 1 is an end view of a constant velocity joint.
Figure 2:
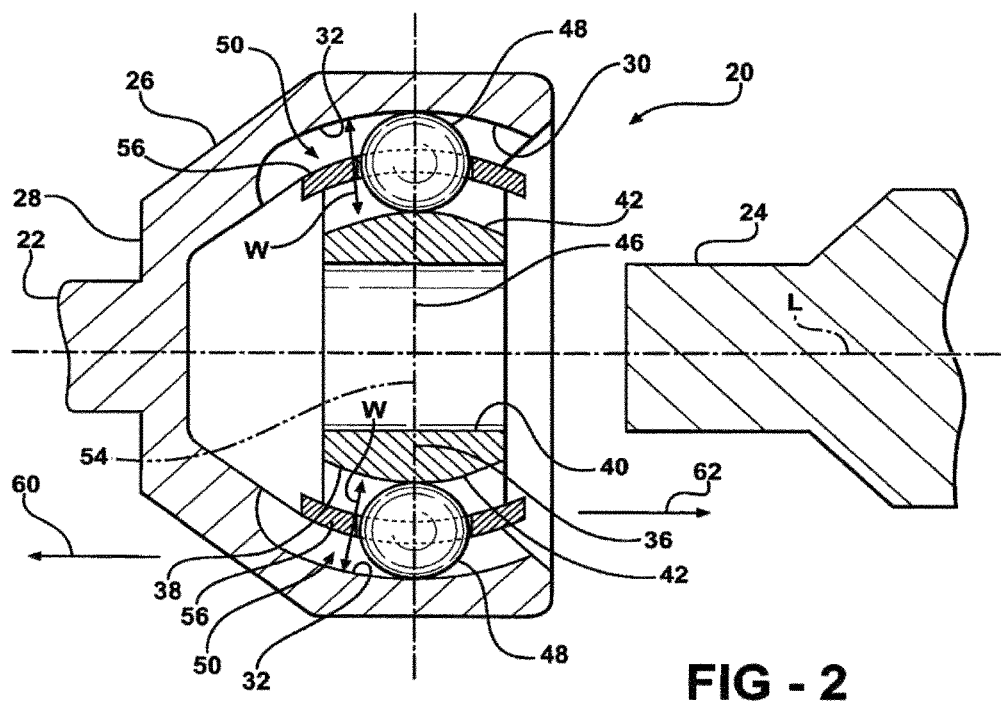
FIG. 2 is a cross section view along cut line 2-2 shown in FIG. 1.

Referring to the Figures, wherein like numerals indicate corresponding parts throughout the several views, a constant velocity joint is generally shown at 20. The constant velocity joint 20 rotatably couples a drive shaft 22 to a driven shaft 24. The constant velocity joint 20 permits relative rotation between the drive shaft 22 and the driven shaft 24 when the drive shaft 22 and the driven shaft 24 are angled relative to each other as is well known in the art.

The constant velocity joint 20 includes an outer member 26. The outer member 26 includes an attachment end 28 for coupling the outer member 26 to the drive shaft 22. Typically, the drive shaft 22 is integrally formed with the outer member 26. However, it should be appreciated that the drive shaft 22 may be fixedly connected to the attachment end 28 of the outer member 26 by any suitable method.

The outer member 26 defines an interior 30 and a plurality of outer member ball tracks 32, 34 within the interior 30. The interior 30 and the plurality of outer member ball tracks 32, 34 extend along a longitudinal axis L. The plurality of outer member ball tracks 32, 34 includes a first group of outer member ball tracks 32 and a second group of outer member ball tracks 34. Preferably, the first group of outer member ball tracks 32 and the second group of outer member ball tracks 34 include a longitudinally curved cross section extending along the longitudinal axis L, and a semi-circular cross section extending transverse to the longitudinal axis L. The curved longitudinal cross section of each of the first group of outer member ball tracks 32 and the second group of outer member ball tracks 34 define an outer race center 36 positioned axially along the longitudinal axis L. However, it should be appreciated that the first group of outer member ball tracks 32 and the second group of outer member ball tracks 34 may include a shape other than the longitudinally curved cross section shown and described herein.

An inner member 38 is disposed within the interior 30 of the outer member 26. The inner member 38 defines an aperture 40 for receiving the driven shaft 24 therein, which extends away from the attachment end 28. The driven shaft 24 is coupled to the inner member 38 for rotation with the inner member 38. For example, the aperture 40 and the driven shaft 24 may include complimentary splines for engaging each other. It should be appreciated, however, that the driven shaft 24 may be coupled to the inner member 38 in some other suitable manner not described herein.

The inner member 38 defines a plurality of inner member ball tracks 42, 44, which extend along the longitudinal axis L. The plurality of inner member ball tracks 42, 44 includes a first group of inner member ball tracks 42 and a second group of inner member ball tracks 44. Preferably, the first group of inner member ball tracks 42 and the second group of inner member ball tracks 44 include a longitudinally curved cross section extending along the longitudinal axis L, and a semi-circular cross section extending transverse to the longitudinal axis L. The longitudinal curved cross section of each of the first group of inner member ball tracks 42 and the second group of inner member ball tracks 44 define an inner race center 46 positioned axially along the longitudinal axis L. However, it should be appreciated that the first group of inner member ball tracks 42 and the second group of inner member ball tracks 44 may include a shape other than the longitudinally curved cross section shown and described herein.

The constant velocity joint 20 further comprises a plurality of drive balls 48. The plurality of drive balls 48 includes a spherical shape and transmit torque between the outer member 26 and the inner member 38. One of the plurality of drive balls 48 is disposed within each of the first group of funnels 50 and within each of the second group of funnels 52. Each of the drive balls 48 include a ball center 54 axially positioned along the longitudinal axis L.

A cage 56 is disposed between the outer member 26 and the inner member 38. The cage 56 defines a plurality of windows 58 with one of the plurality of drive balls 48 disposed within each of the plurality of windows 58. The cage 56 maintains the drive balls 48 in a plane as the constant velocity joint 20 articulates to permit relative angular movement between the drive shaft 22 and the drive shaft 22.

The first group of inner member ball tracks 42 opposes the first group of outer member ball tracks 32 to define a first group of funnels 50. The first group of inner member ball tracks 42 and the first group of outer member ball tracks 32 of the first group of funnels 50 are spaced from each other in parallel relationship relative to each other, and cooperate to define a uniform width W between the first group of inner member ball tracks 42 and the first group of outer member ball tracks 32, along the longitudinal axis L. In other words, the first group of inner member ball tracks 42 and the first group of outer member ball tracks 32 of the first group of funnels 50 are concentric such that they do not diverge from one another. The uniform width W between the first group of inner member ball tracks 42 and the first group of outer member ball tracks 32 define a plurality of uniform funnels 50. The plurality of uniform funnels 50 extends axially along the longitudinal axis L. The uniform funnels 50 includes each opposing pair of the inner race centers 46 and the outer race centers 36 aligned with each other and also aligned with the ball centers 54 of the drive balls 48 disposed within the uniform funnels 50. As such, there is no offset between the inner race centers 46 and the ball centers 54, nor between the outer race centers 36 and the ball centers 54.

The second group of inner member ball tracks 44 opposes the second group of outer member ball tracks 34 to define a second group of funnels 52. The second group of inner member ball tracks 44 and the second group of outer member ball tracks 34 of the second group of funnels 52 are spaced from each other in non-parallel relationship to define a diverging width W between the second group of inner member ball tracks 44 and the second group of outer member ball tracks 34, along the longitudinal axis L. In other words, the second group of inner member ball tracks 44 and the second group of outer member ball tracks 34 of the second group of funnels 52 are not concentric and diverge from one another in an axial direction along the longitudinal axis L. The diverging width W between the second group of inner member ball tracks 44 and the second group of outer member ball tracks 34 define a plurality of diverging funnels 52. The diverging funnels 52 extend axially along the longitudinal axis L.

The diverging funnels 52 include each opposing pair of the inner race centers 46 and the outer race centers 36 offset from the axial position along the longitudinal axis L of the ball centers 54 of the drive balls 48 disposed within the diverging funnels 52, with the ball centers 54 disposed between the inner race centers 46 and the outer race centers 36 along the longitudinal axis L.

The direction the drive balls 48 are urged by the diverging funnels 52 is dependent upon the direction in which the diverging funnels 52 are diverging. For example, if the diverging funnel 52 diverges toward the attachment end 28, i.e., if the diverging funnel 52 expands with a decrease in distance relative to the attachment end 28, then the drive balls 48 are urged in a first direction 60 parallel the longitudinal axis L toward the attachment end 28. Alternatively, if the diverging funnel 52 diverges away form the attachment end 28, i.e., if the diverging funnel 52 expands with an increase in distance relative to the attachment end 28, then the drive balls 48 are urged in a second direction 62 parallel the longitudinal axis L away from the attachment end 28.

One way to control the direction of the diverging funnels 52 is the relative placement of the inner race centers 46 and the outer race centers 36 relative to the ball centers 54. If the outer race center 36 is positioned along the longitudinal axis L farther from the attachment end 28 than the inner race center 46, with the ball center 54 positioned therebetween, the offset between the outer race center 36 and the inner race center 46 opens the diverging funnel 52 toward the attachment end 28 and will urge the drive ball 48 in the first direction 60 toward the attachment end 28. Alternatively, if the outer race center 36 is positioned along the longitudinal axis L nearer the attachment end 28 than the inner race center 46, with the ball center 54 disposed therebetween, the offset between the outer race center 36 and the inner race center 46 opens the diverging funnel 52 away from the attachment end 28 and will urge the drive all in the second direction 62 away from the attachment end 28. It should be appreciated that constant velocity joint 20 may include some other manner of diverging funnels 52 not described or shown herein.

Preferably, the plurality of uniform funnels 50 and the plurality of diverging funnels 52 are arranged radially about the longitudinal axis L in alternating relationship relative to each other. Accordingly, there are an equal number of uniform funnels 50 and diverging funnels 52. Preferably, the uniform funnels 50 include a group having four funnels and the diverging funnels 52 include a group having four funnels. However, it should be appreciated that the subject invention does not require the number of uniform funnels 50 to equal the number of diverging funnels 52. It should also be appreciated that the number of uniform funnels 50 and the number of diverging funnels 52 may vary form that shown or described herein.

Preferably, the plurality of diverging funnels 52 includes a first subset 64 and a second subset 66. The first subset 64 of the plurality of diverging funnels 52 diverges toward the attachment end 28 in a first direction 60 along the longitudinal axis L. The second subset 66 of the plurality of diverging funnels 52 diverges away from the attachment end 28 in a second direction 62 along the longitudinal axis L. The first subset 64 of the plurality of diverging funnels 52 is equal in number to the second subset 66 of the plurality of diverging funnels 52. Preferably, and as shown in the drawings, the first subset 64 of the plurality of diverging funnels 52 includes two funnels and the second subset 66 of the plurality of diverging funnels 52 includes two funnels.

Figure 5:
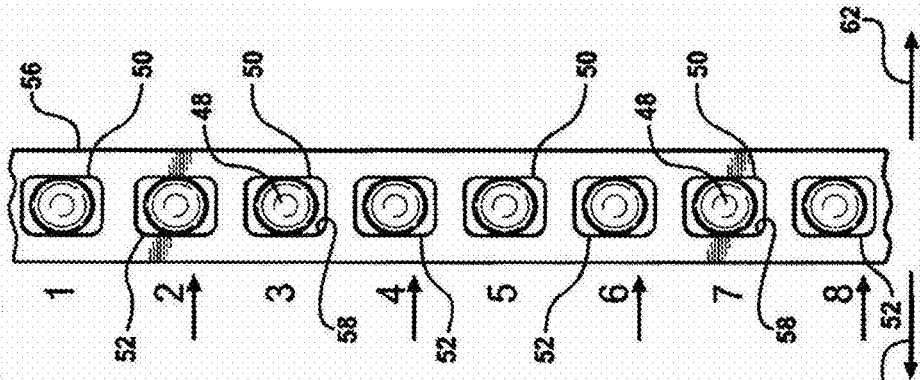
FIG. 5 is a force diagram indicating the forces acting on individual drive balls of the constant velocity joint.

The plurality of uniform funnels 50 are arranged radially about the longitudinal axis L and equally spaced from each other with the first subset 64 of the plurality of diverging funnels 52 arranged opposite each other about the longitudinal axis L and the second subset 66 of the plurality of diverging funnels 52 arranged opposite each other about the longitudinal axis L. In other words, the diverging funnels 52 and the uniform funnels 50 alternate so that there are two pairs of uniform funnels 50 disposed radially opposite each other about the longitudinal axis L, with the first subset 64 of diverging funnels 52 disposed between the uniform funnels 50 and radially opposite each other and the second subset 66 of diverging funnels 52 disposed between the uniform funnels 50 and radially opposed to each other. Referring to FIG. 5, the direction of the force applied to each of the drive balls 48 is schematically shown.

Figure 6:
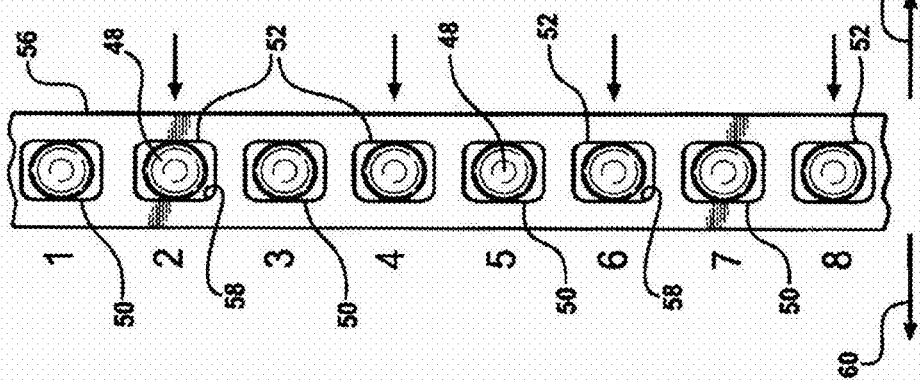
FIG. 6 is a force diagram for a second embodiment of the constant velocity joint indicating the forces acting on the individual drive balls of the second embodiment of the constant velocity joint.

In a second embodiment, all of the plurality of diverging funnels 52 diverge toward the attachment end 28 in a first direction 60 along the longitudinal axis L to urge the plurality of drive balls 48 in the first direction 60. Referring to FIG. 6, the direction of the force applied to each of the drive balls 48 of the second embodiment of the constant velocity joint 20 is schematically shown.

Figure 7:
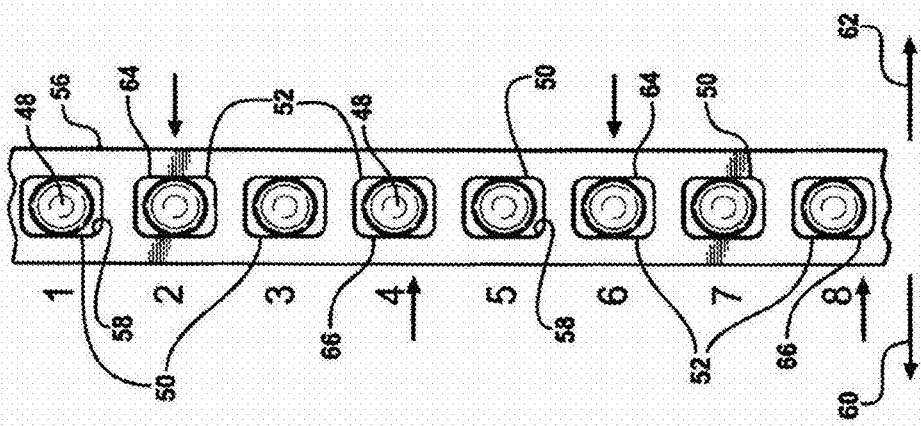
FIG. 7 is a force diagram for a third embodiment of the constant velocity joint indicating the forces acting on the individual drive balls of the third embodiment of the constant velocity joint.

In a third embodiment, all of the plurality of diverging funnels 52 diverge away from the attachment end 28 in a second direction 62 along the longitudinal axis L to urge the plurality of drive balls 48 in the second direction 62. Referring to FIG. 7, the direction of the force applied to each of the drive balls 48 of the third embodiment of the constant velocity joint 20 is schematically shown.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A constant velocity joint comprising:
an outer member defining an interior and a plurality of outer member ball tracks within said interior extending along a longitudinal axis with said plurality of outer member ball tracks including a first group of outer member ball tracks and a second group of outer member ball tracks;
an inner member disposed within said interior and defining a plurality of inner member ball tracks extending along said longitudinal axis with said plurality of inner member ball tracks including a first group of inner member ball tracks and a second group of inner member ball tracks;
said first group of inner member ball tracks opposing said first group of outer member ball tracks to define a first group of funnels and said second group of inner member ball tracks opposing said second group of outer member ball tracks to define a second group of funnels;
a plurality of drive balls with one of said plurality of drive balls disposed within each of said first group of funnels and within each of said second group of funnels;
a cage disposed between said outer member and said inner member and defining a plurality of windows with one of said plurality of drive balls disposed within each of said plurality of windows;
said first group of inner member ball tracks and said first group of outer member ball tracks of said first group of funnels spaced from each other in parallel relationship relative to each other to define a uniform width between said first group of inner member ball tracks and said first group of outer member ball tracks along said longitudinal axis to define a plurality of uniform funnels and said second group of inner member ball tracks and said second group of outer member ball tracks of said second group of funnels spaced from each other in non-parallel relationship to define a diverging width between said second group of inner member ball tracks and said second group of outer member ball tracks along said longitudinal axis to define a plurality of diverging funnels, said plurality of uniform funnels located radially opposite one another about the longitudinal axis in radially opposing pairs and said plurality of diverging funnels located radially opposite one another about the longitudinal axis in radially opposing pairs.

2. A constant velocity joint as set forth in claim 1 wherein said plurality of uniform funnels and said plurality of diverging funnels are arranged radially about said longitudinal axis in alternating relationship relative to each other.

3. A constant velocity joint as set forth in claim 2 wherein said outer member includes an attachment end for coupling said outer member to a drive shaft.

4. A constant velocity joint as set forth in claim 3 wherein said plurality of diverging funnels diverge toward said attachment end in a first direction along said longitudinal axis to urge said plurality of drive balls in said first direction.

5. A constant velocity joint as set forth in claim 3 wherein said plurality of diverging funnels diverge away from said attachment end in a second direction along said longitudinal axis to urge said plurality of drive balls in said second direction.

6. A constant velocity joint as set forth in claim 3 wherein said plurality of diverging funnels includes a first subset and a second subset and wherein said first subset of said plurality of diverging funnels are located radially opposite one another about the longitudinal axis in radially opposing pairs and diverge toward said attachment end in a first direction along said longitudinal axis and said second subset of said plurality of diverging funnels are located radially opposite one another about the longitudinal axis in radially opposing pairs and diverge away from said attachment end in a second direction along said longitudinal axis.

7. A constant velocity joint as set forth in claim 6 wherein said first subset of said plurality of diverging funnels is equal in number to said second subset of said plurality of diverging funnels.

8. A constant velocity joint as set forth in claim 7 wherein said plurality of uniform funnels includes a group having four funnels and said plurality of diverging funnels includes a group having four funnels.

9. A constant velocity joint as set forth in claim 8 wherein said first subset of said plurality of diverging funnels includes two funnels and said second subset of said plurality of diverging funnels includes two funnels.

10. A constant velocity joint as set forth in claim 9 wherein said plurality of uniform funnels are arranged radially about said longitudinal axis and equally spaced from each other with said first subset of said plurality of diverging funnels arranged opposite each other about said longitudinal axis and said second subset of said plurality of diverging funnels arranged opposite each other about said longitudinal axis.

11. A constant velocity joint as set forth in claim 3 wherein said inner member defines an aperture for receiving a driven shaft therein extending away from said attachment end.

12. A constant velocity joint as set forth in claim 1 wherein said plurality of drive balls include a spherical shape.

13. A constant velocity joint comprising:
an outer member defining an interior and a plurality of outer member ball tracks within said interior extending along a longitudinal axis with said plurality of outer member ball tracks including a first group of outer member ball tracks and a second group of outer member ball tracks, said outer member includes an attachment end for coupling said outer member to a drive shaft;
an inner member disposed within said interior and defining a plurality of inner member ball tracks extending along said longitudinal axis with said plurality of inner member ball tracks including a first group of inner member ball tracks and a second group of inner member ball tracks;
said first group of inner member ball tracks opposing said first group of outer member ball tracks to define a first group of funnels and said second group of inner member ball tracks opposing said second group of outer member ball tracks to define a second group of funnels;
a plurality of drive balls with one of said plurality of drive balls disposed within each of said first group of funnels and within each of said second group of funnels;
a cage disposed between said outer member and said inner member and defining a plurality of windows with one of said plurality of drive balls disposed within each of said plurality of windows;
said first group of inner member ball tracks and said first group of outer member ball tracks of said first group of funnels spaced from each other in parallel relationship relative to each other to define a uniform width between said first group of inner member ball tracks and said first group of outer member ball tracks along said longitudinal axis to define a plurality of uniform funnels and said second group of inner member ball tracks and said second group of outer member ball tracks of said second group of funnels spaced from each other in non-parallel relationship to define a diverging width between said second group of inner member ball tracks and said second group of outer member ball tracks along said longitudinal axis to define a plurality of diverging funnels, said plurality of diverging funnels includes a first subset and a second subset wherein said first subset of said plurality of diverging funnels diverge toward said attachment end in a first direction along said longitudinal axis and said second subset of said plurality of diverging funnels diverge away from said attachment end in a second direction along said longitudinal axis, said plurality of uniform funnels and said plurality of diverging funnels are arranged radially about said longitudinal axis in alternating relationship relative to each other, at least two of said plurality of uniform funnels or said plurality of diverging funnels located opposite one another about the longitudinal axis.

14. A constant velocity joint as set forth in claim 13 wherein said first subset of said plurality of diverging funnels is equal in number to said second subset of said plurality of diverging funnels.

15. A constant velocity joint as set forth in claim 14 wherein said plurality of uniform funnels includes a group having four funnels and said plurality of diverging funnels includes a group having four funnels.

16. A constant velocity joint as set forth in claim 15 wherein said first subset of said plurality of diverging funnels includes two funnels and said second subset of said plurality of diverging funnels includes two funnels.

* * * * *